(12) United States Patent
Kalhan et al.

(10) Patent No.: US 12,262,336 B2
(45) Date of Patent: Mar. 25, 2025

(54) SCHEDULED DEVICE-SPECIFIC SYNCHRONIZATION SIGNALS WITH PAGE MESSAGE INDICATION

(71) Applicants: Kyocera Corporation, Kyoto (JP); Amit Kalhan, San Diego, CA (US); Henry Chang, San Diego, CA (US)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 480 days.

(21) Appl. No.: 17/628,812

(22) PCT Filed: Jul. 22, 2020

(86) PCT No.: PCT/US2020/043052
§ 371 (c)(1),
(2) Date: Jan. 20, 2022

(87) PCT Pub. No.: WO2021/016342
PCT Pub. Date: Jan. 28, 2021

(65) Prior Publication Data
US 2022/0264451 A1 Aug. 18, 2022

Related U.S. Application Data

(60) Provisional application No. 62/886,123, filed on Aug. 13, 2019, provisional application No. 62/877,413, filed on Jul. 23, 2019.

(51) Int. Cl.
H04W 56/00 (2009.01)
H04L 5/00 (2006.01)
(Continued)

(52) U.S. Cl.
CPC ......... *H04W 56/001* (2013.01); *H04L 5/0051* (2013.01); *H04L 5/0053* (2013.01); *H04W 48/12* (2013.01); *H04W 52/0216* (2013.01); *H04W 52/0229* (2013.01); *H04W 52/0232* (2013.01); *H04W 52/0274* (2013.01); *H04W 56/0015* (2013.01); *H04W 68/005* (2013.01); *H04W 68/02* (2013.01); *H04W 76/27* (2018.02)

(58) Field of Classification Search
CPC ...................... H04W 52/0216; H04W 52/0229
See application file for complete search history.

(56) References Cited

U.S. PATENT DOCUMENTS

| 7,430,421 B2 * | 9/2008 | Park .................. H04W 52/0216 455/456.1 |
| 8,787,945 B1 * | 7/2014 | Yellin ............... H04W 52/0206 455/574 |
| 2017/0353912 A1 * | 12/2017 | Einhaus ................ H04L 5/0048 |

* cited by examiner

Primary Examiner — Michael A Keller

(57) ABSTRACT

A device-specific synchronization signal (DS-SS) is transmitted by a base station within a data channel transmission to a mobile device before a paging time window for the mobile device. After a sleep state, the mobile device attempts to acquire the DS-SS without decoding a downlink control channel to obtain signal transmission information related to transmission of the page message from a base station. In addition to providing timing information for resynchronization, the DS-SS indicates the existence of a page message for the mobile device within the data channel. The mobile device returns to the sleep state in response to not detecting a DS-SS that indicates a page message. Prior to entering a sleep state, the mobile device receives transmission format information indicative of a transmission format of the DS-SS.

18 Claims, 9 Drawing Sheets

(51) Int. Cl.
*H04W 48/12* (2009.01)
*H04W 52/02* (2009.01)
*H04W 68/00* (2009.01)
*H04W 68/02* (2009.01)
*H04W 76/27* (2018.01)

SCHEDULED DEVICE-SPECIFIC SYNCHRONIZATION SIGNALS WITH PAGE MESSAGE INDICATION

CLAIM OF PRIORITY

The present application claims priority to Provisional Application No. 62/877,413, entitled "Increasing MTC Devices Power-Consumption Efficiency by Using Paging with A UE-specific Synchronization Signal and Information", filed Jul. 23, 2019 and to Provisional Application No. 62/886,123, entitled "Increasing Wireless Devices Power-Consumption Efficiency with Scheduled UE-specific Synchronization Signal", filed Aug. 13, 2019 which are both assigned to the assignee hereof and hereby expressly incorporated by reference in their entirety.

FIELD

This invention generally relates to wireless communications and more particularly to transmission of device-specific synchronization signals with page message indication to user equipment mobile devices.

BACKGROUND

In a wireless network, the mobile device or user equipment (UE) is required to maintain an accurate symbol timing synchronization with the serving base station. The network synchronization is needed to correctly decode the received downlink signals transmitted from the base station. The mobile device "listens" or monitors the synchronization signal transmitted by the serving base station to adjust the internal clock of the mobile device which allows tracking of the symbol, slot and frame time boundaries. In order to save power, the mobile device periodically turns off its transceiver to go to a sleep state. The mobile device periodically wakes-up from the sleep state to check whether a page message was received from the base station. If a page is received, the mobile device stays on to receive the subsequent control and data signals. Battery consumption at the mobile device is reduced by increasing the time the mobile device is in the sleep state. There is a drawback of a long duration sleep state, however, in that the mobile device clock may drift away from the nominal timing value. As a result, every time the mobile device wakes up from sleep, the mobile device typically needs to reacquire the symbol timing before checking the page message. Although the time required for resynchronization can be reduced by reducing the sleep duration, the time required for resynchronization is often more than the time required to receive and decode the page message.

SUMMARY

A device-specific synchronization signal (DS-SS) is transmitted by a base station within a data channel transmission to a mobile device before a paging time window for the mobile device. After a sleep state, the mobile device attempts to acquire the DS-SS without decoding a downlink control channel to obtain signal transmission information related to transmission of the page message from a base station. In addition to providing timing information for resynchronization, the DS-SS indicates the existence of a page message for the mobile device within the data channel. The mobile device returns to the sleep state in response to not detecting a DS-SS that indicates a page message. Prior to entering a sleep state, the mobile device receives transmission format information indicative of a transmission format of the DS-SS. Page message timing information indicative of a transmission time of the page message can also be received prior to entering the sleep state. Additional transmission resource information of the page message may also be obtained from a header of the page message in some circumstances.

DETAILED DESCRIPTION

Figure 1:
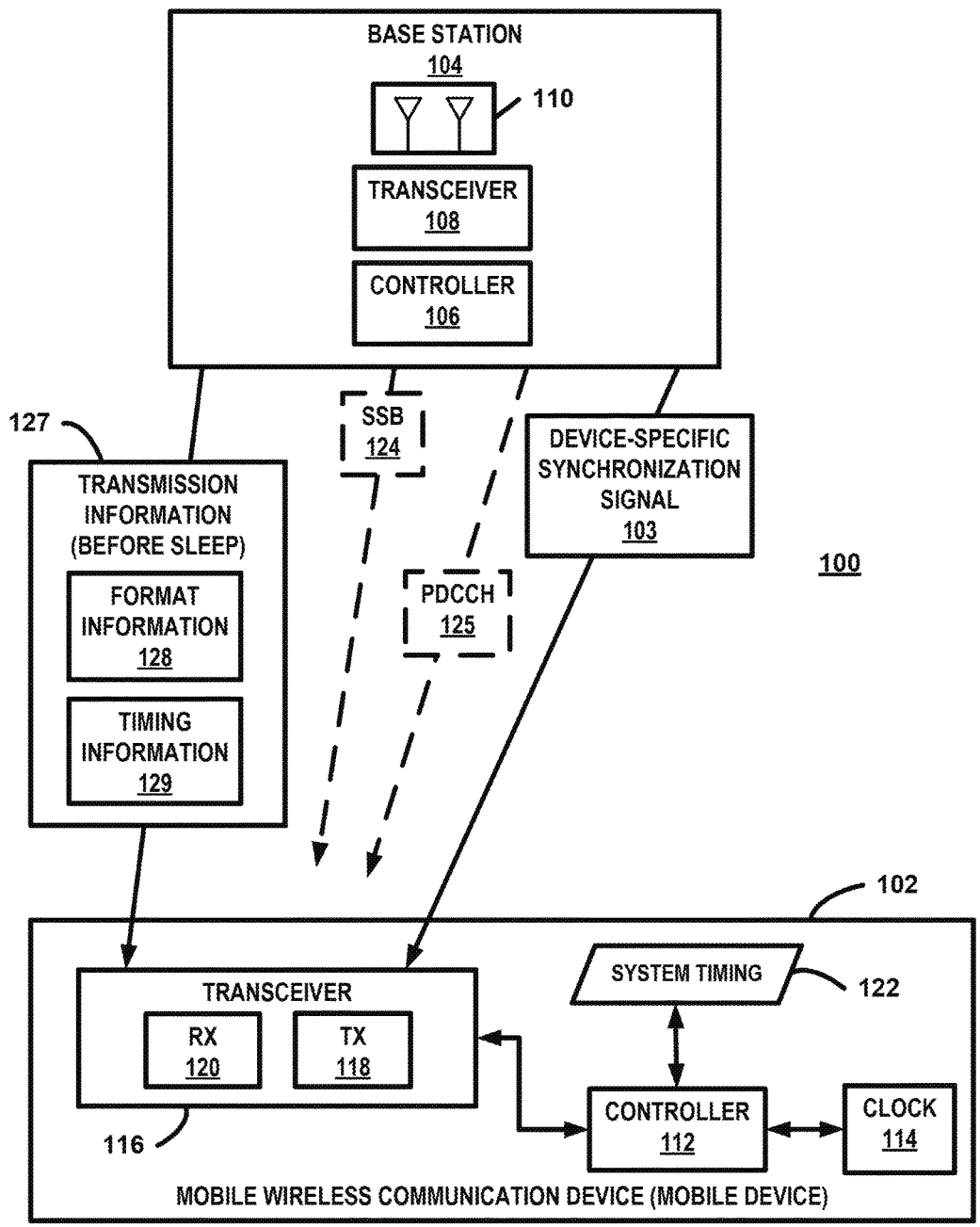
FIG. 1 is a block diagram of a communication system for an example where a mobile wireless user equipment (UE) device (mobile device) receives a device-specific synchronization signal (DS-SS).

As discussed above, mobile devices need to wake up from the sleep state to check for page messages. In some conventional systems, the mobile device periodically exists the sleep cycle, acquires a synchronization signal and decodes a physical downlink control channel (PDCCH) to determine if a page message indication is present. The mobile device, however, must wake up before the arrival of the page message indication in order to allow adequate time for circuitry to warmup. In such systems and in situations where the sleep time is relatively long, the time for decoding the PDCCH is typically much less than the time required to warmup and synchronize. If no page message indication is found, the mobile device returns to the sleep state and the process is repeated in the next wakeup cycle. Since it is unlikely that a page message is sent, the mobile device inefficiently consumes power in checking for page messages by warming up and synchronizing in situations where no page message has been sent. In order to reduce the time needed to decode the PDCCH, some systems have deployed a wake-up signal (WUS) that eliminates the need to decode the entire PDCCH to determine is paging indicator is present. The WUS is relatively short and transmitted at a time before the device is scheduled to wake up to decode the PDCCH during the predetermined time duration. The WUS indicates whether page message indicator is available for the mobile device. As a result, the time spent determining whether a page message indicator is present is reduced when no page message indicator has been sent. This resynchronization time becomes a much larger overhead for the Machine-type-Communications (MTC) UE devices. Achieving a long battery-life, on the order of 10 years, 15 years or more, is an important aspect for the MTC networks. As a result, MTC devices typically have a much longer sleep-cycle which may be on the order of several minutes or several hours. Specifically, with extended-DRX (eDRX), the DRX cycle is extended up to and beyond 10.24s in idle mode, with a maximum value of 2621.44 seconds (43.69 minutes). For NB-IoT, the maximum value of the DRX cycle is 10485.76 seconds (2.91 hours). Such a long sleep duration results in much larger clock-drifts for the mobile device (UEs). In addition, the MTC devices operate in deep coverage areas where the downlink received signal strength is very low. In extreme scenarios the received signal strength could be as low as SNR=−14 dB. Having a large clock-drift and receiving a signal at very low signal strength forces the MTC devices to take several hundreds of milliseconds to acquire the network timing. The relatively long time needed to detect the correct timing is due to the need for the devices to receive and accumulate multiple repetitions of the synchronization signal over time. In order to achieve a higher SNR, the mobile devices coherently combine the multiple copies of the synchronization signal. The difference in the time required to acquire synchronization compared to the time required to decode the PDCCH, therefore is even larger for MTC devices. For example, in the existing MTC LTE, a mobile device would require almost 400 ms=80 PSS/SSS subframes with PSS/SSS transmitted every 5 ms whereas only a few microseconds are required to decode the PDCCH. Even with the use of a WUS, the time required determine if a page message has been sent is still relatively long.

In some of the examples discussed herein, however, the time needed to determine that no page message has been sent is significantly reduced by a process where, after exiting the sleep state, the mobile device attempts to detect a device-specific synchronization signal (DS-SS) without full synchronization using a System Synchronization Block (SSB) and without decoding the control channel. The synchronization signals used in conventional systems include additional information that does not need to be obtained by the mobile device in some of the examples herein. For example, conventional systems obtain synchronization by detecting and receiving the Synchronization Signal Block (SSB) which contains the Primary Synchronization Signal (PSS) and Secondary Synchronization Signal (SSS) as well as other information. For some of the examples discussed herein, however, the mobile device can determine when no page message indicator has been sent without time consuming synchronization or decoding of the downlink control channel. In these examples, additional processing is only performed when the DS-SS indicates a page message has been sent. Therefore, energy for receiving synchronization signals in the SSB is reduced by eliminating the need to synchronize to the PSS/SSS in the SSB prior to checking on the exists of page message. In addition, in some circumstances, mobile device operation is more efficient when exiting the sleep state since the mobile device is able to skip the step of decoding the control channel, such as the PDCCH, before receiving and directly decoding the channel including the page message such as the PDSCH. Reducing the time and energy for conventional resynchronization reduces power consumption and extends battery life. For the examples herein, the mobile device retains page message transmission information including at least transmission format information indicative of a transmission format of a page message for the mobile device and page message timing information indicative of a transmission time of the page message. Some or all of the transmission information may be received in a transmission from the base station before the mobile device enters the sleep state. The transmission information can be transmitted at any point before the mobile device enters the sleep state and may be transmitted over more than one transmission. For at least some of the examples herein, the transmission information is transmitted to the mobile device using dedicated signaling (e.g., RRC Connection Release message) or via system information before the mobile device enters the sleep state. In some circumstances, however, the mobile device may be configured with at least some of the transmission information when registering with the network. For example, the mobile device can be firmware-programmed to be preconfigured with the transmission information in some situations.

Although for some of the examples, the DS-SS may specific to an individual mobile device, the DS-SS may be specific to more than one mobile device sharing the same paging time window (PTW). Further, the DS-SS may be used by a mobile device that does not share the PTW. In addition, the DS-SS can be used for synchronization without page message notification. The DS-SS transmitted before paging time window (PTW) can be used by either a mobile device that is scheduled to receive the page message in the PTW or another mobile device that is aware of the transmission parameters of the DS-SS. For example, the PTW transmission time can be broadcast to mobile devices that are not schedule to receive a page in the particular PTW. These mobile devices can use the DS-SS for synchronization. Such a technique may be useful were a mobile device has data to transmit. The mobile device can avoid energy consuming conventional synchronization methods by synchronizing to the DS-SS before uplink data transmission.

Therefore, the techniques discussed herein include a DS-SS transmitted to a mobile device over physical downlink data channel after a sleep state at a time relative to a PTW of the mobile device. For at least some of the examples discussed below, the physical data channel is referred to as the Physical Downlink Shared Channel (PDSCH) in accordance with 3GPP and the control channel is referred to as the Physical Downlink Control Channel (PDCCH). However, these channels may be referred to by other terms based on the particular communication standard and technology. In addition, in some situations, other physical downlink channels may be used for transmitting the page message. For example, a paging physical downlink channel may be designated for page message transmissions in some systems. Therefore, the PDSCH is only discussed as an example of a physical downlink channel where the DS-SS and page message are transmitted.

FIG. 1 is a block diagram of a communication system 100 for an example where a mobile wireless user equipment (UE) device (mobile device) 102 receives a device-specific synchronization signal (DS-SS) 103. The DS-SS 103 is transmitted over a physical downlink channel. For the examples discussed herein, the physical downlink channel is a data channel that also supports transmission of data to the mobile device. Also, for at least some of the examples, the downlink channel is the channel used for sending page messages. Where the system operates in accordance with at least some communication standards, the DS-SS 103 is transmitted over the Physical Downlink Shared Channel (PDSCH). Other downlink channels can be used for transmitting the DS-SS 103 in some circumstances depending on the particular system and communication standard. As discussed herein, the DS-SS is specific in that it is transmitted specifically for servicing at least one mobile device. The DS-SS, however, may service more than one mobile device and may apply to, for example, a group of mobile devices. Also, other mobile devices may use the DS-SS even though those devices were not the specific targets of the DS-SS transmission. The DS-SS, therefore, may not be a signal uniquely associated with a single mobile device. For at least some of the examples, the mobile device determines whether a page exists for the mobile device by attempting to acquire the DS-SS after exiting a sleep state and without receiving a downlink control channel transmission or receiving a System Synchronization Block (SSB). In some situations, the mobile device may receive a reduced number of SSB transmissions before attempting to receive the page message as compared to the number of SSB receptions required in conventional systems when exiting sleep to monitor for page messages. In other situations, the mobile device may receive the DS-SS, determine that a page exists for the mobile device and then decode other channels if a page message exists for the mobile device. For example, the mobile device may decode the SSB and/or the PDCCH in response to an indication in the DS-SS that a page message is sent.

The communication system 100 includes numerous base stations, such as the base station 104, that provide various wireless services to mobile devices that are located within the respective service areas of the base stations. In the interest of clarity and brevity, the communication system 100 of FIG. 1 is shown as having only one base station 104 and only one mobile device 102. The communication system 100 may include any number of base stations and mobile devices. For the example, the communication system 100 operates in accordance with one or more revisions of the 3rd Generation Partnership Project Long Term Evolution (3GPP LTE) communication specification and/or revisions of the 5G New Radio communication specification.

The base station 104 may be referred to as a transceiver station, access point, eNodeB or eNB where the applied terms sometimes depend on the communication technology that the system supports. In the case of implementations that utilize the 5G New Radio air interface, the base station is sometimes referred to as a gNB. The base station 104 communicates with wireless user equipment mobile devices, such as the mobile device 102, by transmitting downlink signals to the mobile devices and receiving uplink signals from the mobile devices. The base station 104 includes a controller 106, transceiver 108, and an antenna 110, as well as other electronics, hardware, and code. The base station 104 is any fixed, mobile, or portable equipment that performs the functions described herein. The various functions and operations of the blocks described with reference to the base station 104 may be implemented in any number of devices, circuits, or elements. Two or more of the functional blocks may be integrated in a single device, and the functions described as performed in any single device may be implemented over several devices. The base station 104 may be a fixed device or apparatus that is installed at a particular location at the time of system deployment. Examples of such equipment include fixed base stations or fixed transceiver stations. In some situations, the base station 104 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 104 may be a portable device that is not fixed to any particular location. Accordingly, the base station 104 may be a portable user device such as a mobile device in some circumstances.

The controller 106 includes any combination of hardware, software, and/or firmware for executing the functions described herein as well as facilitating the overall functionality of the base station 104. An example of a suitable controller 106 includes code running on a microprocessor or processor arrangement connected to memory. The transceiver 108 includes a transmitter and a receiver. The transmitter includes electronics configured to transmit wireless signals. In some situations, the transmitter may include multiple transmitters. The receiver includes electronics configured to receive wireless signals. In some situations, the receiver may include multiple receivers. The receiver and transmitter receive and transmit signals, respectively, through the antenna 110. The antenna 110 may include separate transmit and receive antennas. In some circumstances, the antenna 110 may include multiple transmit and receive antennas.

The transceiver 108 in the example of FIG. 1 performs radio frequency (RF) processing including modulation and demodulation. The receiver, therefore, may include components such as low noise amplifiers (LNAs) and filters. The transmitter may include filters and amplifiers. Other components may include isolators, matching circuits, and other RF components. These components in combination or cooperation with other components perform the base station functions. The required components may depend on the particular functionality required by the base station.

The transmitter includes a modulator (not shown), and the receiver includes a demodulator (not shown). The modulator modulates the signals to be transmitted as part of the downlink signals and can apply any one of a plurality of modulation orders. The demodulator demodulates any uplink signals received at the base station 104 in accordance with one of a plurality of modulation orders.

In some examples, the mobile device 102 is any mobile wireless communication device such as a mobile phone, a transceiver modem, a personal digital assistant (PDA), a tablet, or a smartphone. In other examples, the mobile device 102 is a machine type communication (MTC) communication device. The mobile device 102, therefore, is any fixed, mobile, or portable equipment that performs the functions described herein. The various functions and operations of the blocks described with reference to mobile device 102 may be implemented in any number of devices, circuits, or elements. Two or more of the functional blocks may be integrated in a single device, and the functions described as performed in any single device may be implemented over several devices.

The mobile device 102 includes at least a controller 112, a clock 114, and a transceiver 116 which includes a transmitter 118 and a receiver 120. The controller 112 includes any combination of hardware, software, and/or firmware for executing the functions described herein as well as facilitating the overall functionality of a mobile device. An example of a suitable controller 112 includes code running on a microprocessor or processor arrangement connected to memory. The clock 114 is any device or circuitry that provides a stable clock signal that can used by the controller to maintain timing and synchronization for general operation. The clock 114 may include a crystal oscillator in some circumstances. The controller 112, in conjunction with the clock 114, maintains a system timing 122 of the system.

The transmitter 118 includes electronics configured to transmit wireless signals. In some situations, the transmitter 118 may include multiple transmitters. The receiver 120 includes electronics configured to receive wireless signals. In some situations, the receiver 120 may include multiple receivers. The receiver 120 and transmitter 118 receive and transmit signals, respectively, through an antenna (not shown) which may include separate transmit and receive antennas. In some circumstances, the antenna may include multiple transmit and receive antennas.

The transmitter 118 and receiver 120 in the example of FIG. 1 perform radio frequency (RF) processing including modulation and demodulation. The receiver 120, therefore, may include components such as low noise amplifiers (LNAs) and filters. The transmitter 118 may include filters and amplifiers. Other components may include isolators, matching circuits, and other RF components. These components in combination or cooperation with other components perform the mobile device functions. The required components may depend on the particular functionality required by the mobile device 102.

As discussed above, the mobile device includes a clock that maintains operational timing for the mobile device. In conjunction with the clock, the controller maintains a system timing 122 of the system. The mobile device 102 periodically receives synchronization signals such as the Primary Synchronization Signal (PSS) and the Secondary Synchronization Signal (SSS) in the SSB 124. Due to imperfections of the clock 114, the clock timing may drift over time and the system timing 122 maintained at the mobile device will lose synchronization with the system. The synchronization signals allow the system timing 122 at the mobile device to be synchronized to the system timing of the communication system. In conventional systems, as discussed above, the mobile device resynchronizes after existing the sleep state. After waking up the mobile device ramps up the radio frequency circuits before acquiring timing by detecting the PSS/SSS. The mobile device then waits to receive the WUS and attempts to detect it. If the WUS is detected successfully, the mobile device determines that the page is sent and stays awake to wait for the paging time window (PTW). At the PTW, the mobile device attempts to decode the Physical Downlink Control Channel (PDCCH) 125 and, if the PDCCH is successfully detected with P-RNTI, the mobile device decodes the associated PDSCH to obtain the page message. If the page is not sent, the attempt to detect WUS is unsuccessful. In accordance with examples herein, however, the mobile device refrains from decoding the control channel (e.g., PDCCH) and from synchronization using the SSB 124 under some conditions and determines whether a page message is sent by attempting to decode a preamble message 126.

For the example, the mobile device 102 receives transmission information 127 from a base station prior to entering the sleep state. The transmission information 127 at least includes transmission format information 128 indicative of the format of the DS-SS 103 which includes information such as signal sequence details including the length, root sequence, and other information which may include the frequency and/or time location(s) of the sequences. In some situations, the transmission information may indicate one or more parameters without explicitly providing values. For example, in some situations, a type indicator may indicate the length and root sequence. The number of preamble sequences to be transmitted may also be indicated in the transmission format information 128. Although the DS-SS 103 may include only a single sequence, the DS-SS 103 comprises multiple copies of the sequence, or sequence instances, in the examples herein. As discussed below in further detail, the sequence copies (instances) may occupy adjacent time segments and/or adjacent frequencies or may be separated in time and/or frequency. Therefore, the transmission information 127 may include information regarding the format and composition of the DS-SS including the arrangement of the multiple sequence instances forming the DS-SS 102 within a time-frequency transmission resource. In some examples, the transmission format information 128 also includes information regarding the transmission format of a page message such as the Modulation and Coding Scheme (MCS), data-block size and the PDSCH resource location used for the page message, for instance. The transmission format information 128 may also include the communication resources that will be used to transmit the page message. In some situations, parameters included in the transmission format information 128 may apply to both the DS-SS 103 and the page message. Where the transmission information 127 includes parameters transmitted in a conventional page message configuration, the parameters may be omitted in the convention page message configuration in some situations. The transmission information may be sent as part of the conventional paging message configuration or may be sent as a separate message depending on the particular implementation. Therefore, a conventional page message configuration can be modified to include the transmission information 127 in some circumstances. The transmission information 127 may also include transmission timing information 129 indicative of the time that the page message will be transmitted by the base station. The transmission information 127 can be conveyed to the mobile device 102 through dedicated signaling (e.g., RRC Connection Release message) or via system information before the mobile device 102 enters the sleep state. Using the format information, the mobile device 102 attempts to acquire the DS-SS 103. In some circumstances, the sequence can include information indicating the existence of a page message for the mobile device. For example, one sequence ($S_0$) may indicate a page message exists for the mobile device and another sequence ($S_1$) may indicate a page message does not exist. In some situations, the successful detection by the mobile device 102 of the DS-SS 103 provides the indication that a page message is being sent and unsuccessful detection by the mobile device of the page DS-SS provides the indication that a page message is not being sent.

Where the mobile device 102 has maintained a system timing 122 that is at least a course timing, in some examples, the mobile device 102 at least attempts to receive the DS-SS without receiving the control channel information. In at least some situations, the DS-SS 103 allows the mobile device to fine tune the system timing 122. Accordingly, the mobile device 102 at least avoids the energy consuming process of decoding the control channel such as the PDCCH and may avoid receiving the SSB, before determining whether a page message has been sent. In some examples, however, the mobile device may receive the DS-SS, determine a page message exists for the mobile device and, in response, decode other channels or signals to determine additional information regarding the transmission for the page message.

The examples discussed above are generally directed to the mobile device that is assigned the paging time window (PTW) and where the DS-SS transmission is directed to that mobile device or mobile device group. As discussed above, the transmission information 127 can be conveyed to such a mobile device using RRC signaling. In some situations, the DS-SS 103 transmission can also be utilized by mobile devices not associated with the PTW and that are not specifically targeted to receive the particular DS-SS. Such mobile devices, however, must be aware of the transmission information 127. A suitable technique for providing the transmission information 127 to such devices includes broadcasting the transmission information 127 from the base station. For example, the information may be included in a system information block (SIB). As a result, these other mobile devices can use the DS-SS to perform resynchronization, if needed. This may be particularly useful in cases where the mobile device needs to initiate a connection due to arrival of new data. For uplink transmissions, mobile device typically needs to acquire synchronization before making the connection request. However, since the uplink data is latency tolerant, the mobile device can delay transmission while acquiring one or more DS-SS transmissions to conserve power during the resynchronization process.

Figure 2:
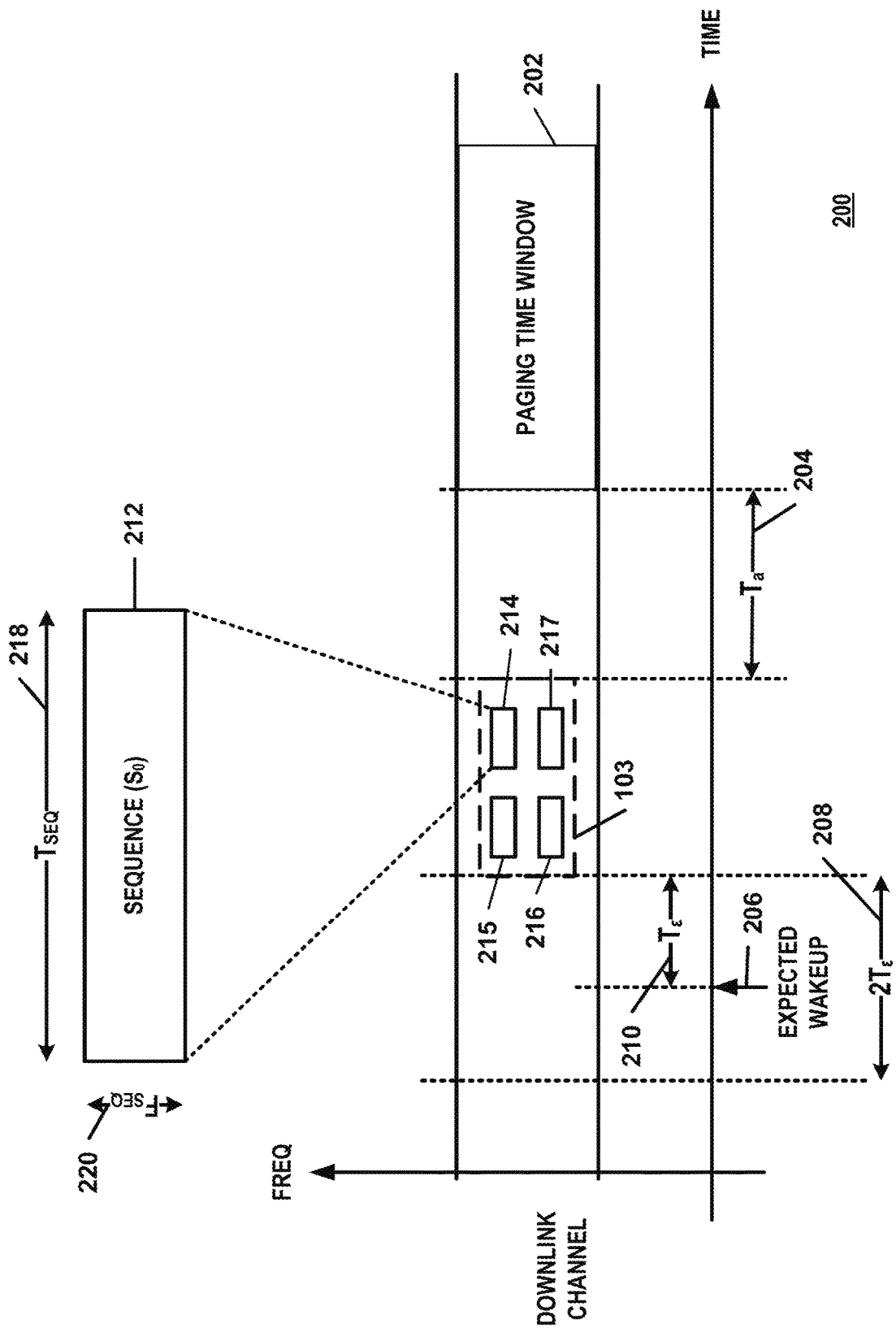
FIG. 2 is an illustration of an example of a DS-SS transmission.

FIG. 2 is an illustration of an example of a DS-SS transmission 200. For the examples herein, the DS-SS 103 transmitted before the PTW 202 of a mobile device. In some situations, however, the mobile device receiving the DS-SS 103 may not be the mobile device that is associated with the particular PTW 202. Any mobile device that is aware of the transmission parameters of the DS-SS can attempt to receive the DS-SS. Although the DS-SS may provide a page message indication to such a mobile device, the mobile device can use the DS-SS for other purposes such as re-synchronization. Also, the DS-SS may be directed to a group of mobile devices that share the same PTW.

For the examples herein, the DS-SS 103 is transmitted at a time such that the entire DS-SS transmission occurs before a time interval ($T_a$) 204 before the start of the PTW 202. For the examples herein, the time interval ($T_a$) 204 is a number of time-slots from the end of the DS-SS to the beginning of the PTW time-slot and can be zero. In some situations, the interval ($T_a$) 204 value provided to the mobile device 102 is a range of values. This provides the base station 104 with flexibility to schedule the actual DS-SS transmission time. The mobile device 102 attempts to acquire the DS-SS at the maximum of the range. For example, if the interval ($T_a$) 204 range is set to 0 to 10 time-slots, once the mobile has successfully acquired the synchronization, the mobile would start attempting to decode the paging channel under the assumption the PTW begins at the next time-slot after the DS-SS ends. If the attempt is unsuccessful then the mobile attempts to decode in the next time-slot and continue till the next 10 time-slots or until it is successful.

The start of the DS-SS transmission is relative to the expected wakeup time 206 of the mobile device 103. For the examples herein, the wakeup time is the time that the mobile device is prepared to receive the DS-SS after exiting the sleep state. Accordingly, the wakeup time is at least partially associated with the sleep-wake cycle of the device such as the DRX cycle. In the examples herein, the mobile device performs a wakeup procedure that includes the warming up of radio circuits in order that the mobile device is capable of receiving signals at the wakeup time. The expected wakeup time 206 is the time that the base station expects the mobile device to wake up. However, the actual wakeup time may not be at the expected wakeup time 206 because of errors in the system timing 122 maintained at the mobile device. For example, clock drift may cause the system timing 122 to be misaligned with the actual system timing. The actual wakeup time, therefore, can be anywhere within an expected wakeup window 208 having a width that is twice the maximum possible timing error, $T_\epsilon$, of the mobile device. The DS-SS is transmitted such that the start of the DS-SS is less than the maximum timing error ($T_\epsilon$) period 210 after the expected wakeup time 206.

For the example of FIG. 2, the DS-SS 103 includes a plurality of sequence instances 214-217 where each sequence instance 212 has time segment length ($T_{SEQ}$) 218 and a frequency band ($F_{SEQ}$) 220. For the examples, the physical downlink channel for transmitting the DS-SS is divided and organized into frequency-time communication resources where the smallest unit is a symbol and is one time slot and one frequency band segment. Each sequence instance 212 may be formed by any number of symbols and may include multiple frequency band segments and multiple time slots.

Although four sequence instances 214-217 are shown in the example of FIG. 2, the DS-SS can include any number of sequence instances. In addition, at least some sequence instances may be adjacent to each other such that any two sequence instances may include adjacent frequencies or adjacent timeslots. Each time sequence instance (214-217) has a unique combination of a frequency portion (or frequency) and a time segment. However, several sequence instances can share the same frequency and be transmitted in different time segments. Similarly, several sequence instances may be transmitted at the same time but have different frequencies. For example, the sequence instance 214 can be transmitted at the same time as the sequence instance 217 but the two have different frequencies and sequence instance 215 can be transmitted at the same frequency as sequence instance 214 but at a different time. Accordingly, for at least some of the examples, a block or array of sequence instances can form the DS-SS where the block as a number of frequency and a number of times. An example of such a DS-SS is discussed below with reference to FIG. 3 where the array has N time segments and M frequencies.

From one perspective, the scheduling of the DS-SS 103 is very much the same as the transmission of a data packet to a mobile device except that the DS-SS is "pre-determined". The location of the DS-SS relative to the PTW allows the mobile device to determine the subframe number within a frame upon successful detection of the DS-SS. As discussed above, the DS-SS is transmitted at time interval, $T_a$, ahead of the upcoming PTW which is known to the mobile device. This assists the mobile device to determine the frame timing when the mobile device wakes-up (exists the sleep state) without the knowledge of the subframe boundaries locations. In one example, parameters such as the number frequencies, number of time segments, $T_a$ time interval period, location(s) of the DS-SS in frequency domain, the sequence-length, sequence assignment, etc. are configured by the base station and then conveyed to the mobile device, As discussed above the parameters can be sent to the Mobile device via dedicated RRC messages before the mobile device enters the sleep state. The parameters the number of time segments and frequencies (N and M) are adjusted for each mobile device (or mobile device group) according to the mobile device's operational carrier-bandwidth, CE-levels and tolerance of the oscillator or clock. The Coverage Enhancement (CE) is a 20 dB better coverage provided to the MTC devices with challenging coverage conditions. The density of the DS-SS (number of sequences per resource block) may be selected based on the receiver's capability and the signal strength. For example, an increased number of time-slots may be used in an NB system where NB-IOT devices operate on a very narrow bandwidth. Similarly, MTC devices located in building basements may receive a very weak signal strength. Relative to typical signal strength, these devices could receive a very weak signal and still successfully detect the DL. The DS-SS density is increased accordingly.

In some situations, PTWs for different mobile devices, or mobile device groups, may occur in close proximity to each other. In one example, a generic DS-SS is transmitted to service at least some of the proximate PTWs. Different time intervals ($T_a$) are selected for the different DS-SS and PTW pairs in order to minimize the possibility that a mobile device will attempt to decode a page message intended for another mobile device. The use of a generic DS-SS, however, restricts the base stations from transmitting a DS-SS that indicates no page is present since there is still the possibility that a mobile device will, in error, decode the indication intended for another mobile device. In some situations, a subframe number (SFN) is provided in a header of the page message which allows the mobile device to determine whether the mobile device had decoded the paging information on the correct subframe.

SFN-specific sequence could also be applied for the UE-SS block. However, this is not a viable solution because the number of SFNs is very large that would drastically increase the number of detection attempts.

Figure 3:
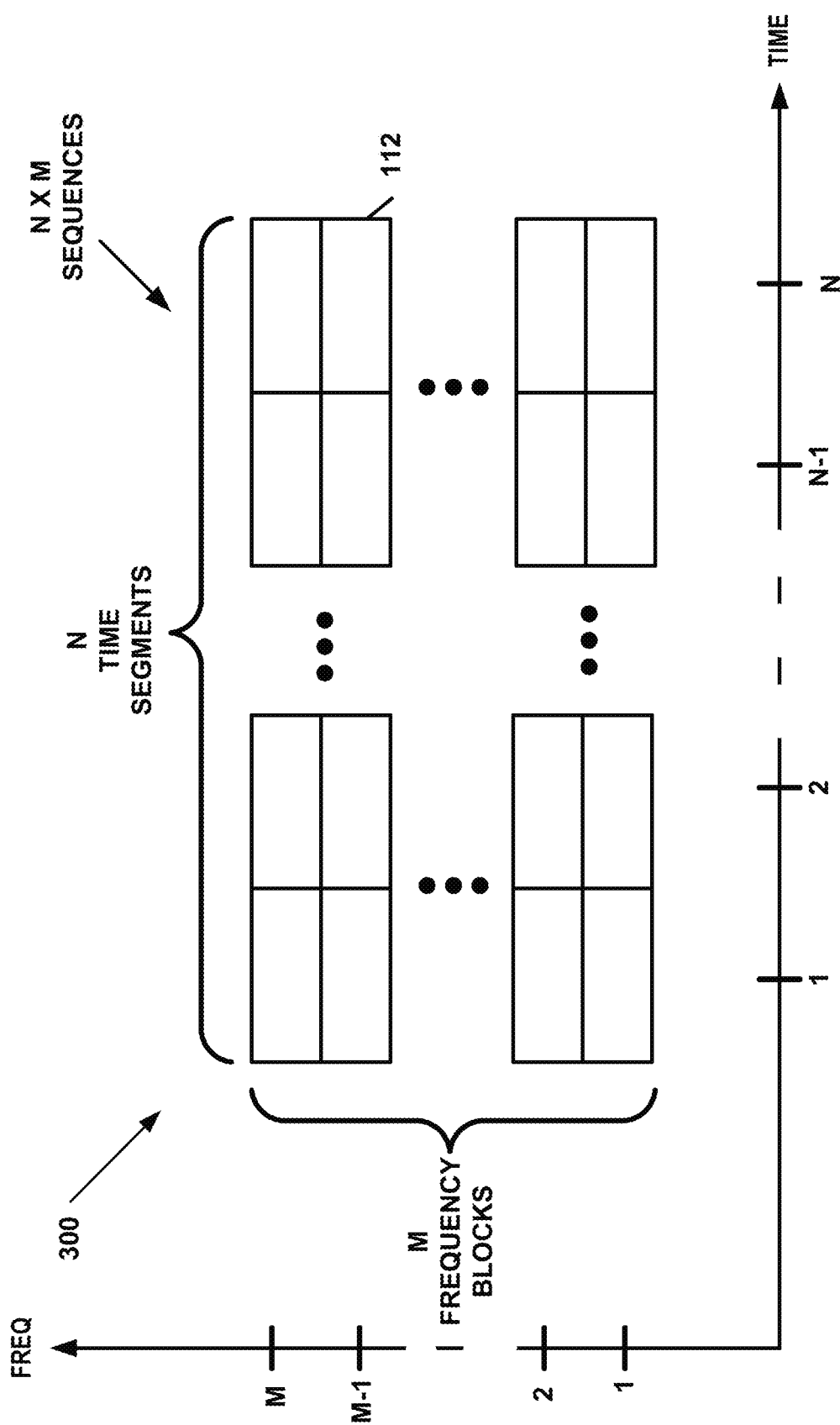
FIG. 3 is an illustration of an example of a DS-SS that includes an N×M array of sequence instances with N time segments by M frequency blocks.

FIG. 3 is an illustration of an example of a DS-SS 300 that includes an N×M array of sequence instances with N time segments by M frequency blocks. Accordingly, the DS-SS 300 of FIG. 3 is an example of the DS-SS transmission 200 of FIG. 2 and the DS-SS 103. FIG. 3 is not to scale and is intended to illustrate the general relationship and organization of the sequence instances in the example. As discussed above, the sequence instances 302 are copies of the same sequence and may or may not be allocated to the consecutive resources. In one implementation each copy is spread out in frequency and time to achieve greater frequency and time diversity, respectively. A sequence instance that spans over a longer period of time provides greater cross-correlation properties to achieve higher successful detection rate.

For the examples herein, the specific format of the DS-SS 300, including the selection of values for M and N, is based on an anticipated success probability. In other words, the number of N×M sequences instances are selected that are expected to result in a given probability that a mobile device successfully decodes the DS-SS 103 and obtains resynchronization. For example, the selection of the format of the N×M DS-SS 300 may include a number of sequence instances (N×M) where the DS-SS is expected to be successfully decoded 95% and not successfully decoded 5% of the time. Each mobile device resynchronization attempt, therefore, may or may not result in a successful decoding where a failed attempt may have been successful if additional sequence instances had been included in the DS-SS. Also, a mobile device may acquire resynchronization before decoding all of the sequence instances of the DS-SS 300. In some circumstances (e.g., no deep fades), therefore, the mobile device might be able to successfully obtain resynchronization before receiving all of the N×M sequence instances and, in other circumstances, resynchronization is not established even though the mobile device attempted to receive all of the sequences in the DS-SS.

Some communication standards and specifications provide more flexible slot structures and may allow for efficient use of the communication resources. For example, 5G NR communication specifications have a much more flexible slot-structure design compared to LTE/LTE-A. In the 5G NR communication specification, each time-slot consists of 14 OFDM symbols. In this design, the base station does not transmit PDCCH and allocates the whole time-slot for PDSCH transmission which facilitates the examples discussed herein. As considered by the 3GPP TS 38.213 specification, slot format 0 consists of all 14 normal-CP downlink symbols with 15 KHz subcarrier spacing. A Resource Element (RE) size is 1 subcarrier×1 symbol and the minimum unit of allocation spans 12 subcarriers×14 symbols equal to 168 resource elements (REs). Assuming a K-length ZC-sequence requires K numbers of REs in a time-slot, there are several possible constructions of the DS-SS for a 63-length ZC sequence. For example, two copies of the same ZC-sequence fits in a time-slot, one 127-length ZC sequence fits in a time-slot or two same 63-length ZC sequences with two different roots fit into one time-slot. The detection performance of each combination could be different and impacts the number of copies to be transmitted to achieve acceptable detection performance. For at least one example herein, two 63-length ZC sequence instances include two different roots designs. Each ZC-sequence instance, however, is deemed to be a single "copy" or instance of the DS-SS even though the root of the sequences may not be the same. The remaining REs are used for transmitting reference signals that can be used for the data demodulation by other mobile devices in one situation. In another situation, the remaining REs are left as blanks since the receiver MTC device does not require the reference signals during the resynchronization process. If a longer sequence (i.e., K is greater than 127) is used for the DS-SS, a copy of the DS-SS is allocated multiple aggregated time-slots.

As discussed above, different sequence instances can be transmitted to indicate whether a page message is available for the mobile device. A first sequence, $S_0$, is used to create the DS-SS block (array) if there is page for the assigned mobile device. If no page is available for the mobile device, the base station transmits the sequence instances (copies) of an alternative sequence, $S_1$, in the DS-SS block. If the mobile device successfully detects the DS-SS with the $S_1$ sequence, it goes back to sleep immediately. The DS-SS block transmission, therefore, can provide a go-to-sleep signal for the mobile device in addition to providing the resynchronization timing. In many conventional systems, multiple mobile devices share the same paging occasions, PO (or PTW) and the paging occasions are hashed using the mobile device identifiers (UE-IDs). Therefore, for some of the examples herein, a mobile device detecting a DS-SS with the $S_0$ sequence reads the paging message to determine whether the paging message for the mobile device where the detecting mobile device shares the PO with at least one other mobile device. In other examples, the DS-SS may be unique to the mobile device. In these examples, therefore, the DS-SS is indeed device specific and not just specific to the PO. The parameters of the unique sequence are conveyed to the mobile device via dedicated signaling before the mobile device enters the sleep state. One advantage of the unique sequence examples is that the mobile device goes back to sleep immediately without reading the paging message if the page is meant for another mobile device that is hashed to the same wake up time based on the PO.

Although advantages may be realized with all types of communications devices, mobile devices and user equipment, the techniques and examples discussed above may be especially useful with MTC devices. The examples and techniques discussed above can be applied to a variety of systems, standards, and circumstances including situations where the mobile device is stationary and where the mobile device is mobile. Some examples where the mobile device may be mobile are discussed below.

Where the MTC mobile device or other UE mobile device is capable of changing geographical location, the serving cell ID might change during the sleep cycle. In conventional systems, after waking up in the Idle mode, the mobile device obtains the cell ID of the serving cell by decoding the PSS/SSS and determines the subframe number information by decoding the Physical Broadcast Channel (PBCH). As a result, the DS-SS techniques discussed herein may include features or options to address the mobility of the mobile device.

In one example, the DS-SS is only used by stationary mobile devices. In these situations, the mobile device notifies the base station of its stationary status. For example, a stationary MTC device may indicate to the serving gNB that the MTC device is stationary and the gNB only transmits a DS-SS to MTC devices that have indicated their stationary status. If mobile device moves to a different cell during the sleep cycle, an attempt by the mobile device to acquire the DS-SS will be unsuccessful since the new cell is not transmitting DS-SS. As a result, the mobile device reverts to the legacy resynchronization procedure where multiple attempts of different PSS/SSS hypotheses may be needed to determine the new cell ID. To ensure reliability, in some situations, the UE-specific DS-SS is sent in multiple cells even if the mobile device is presumed to be stationary. In the alternative, the UE-specific DS-SS and the cell specific DS-SS are both sent, which requires the mobile device to attempt decoding of both types of DS-SS just in case the mobile device has moved to a neighbor cell during sleep whereby only the cell-specific DS-SS can be used. In another example, the DS-SS includes the PSS/SSS. As a result, the DS-SS may not be device specific. Although the mobile device may still need to perform multiple attempts for different PSS/SSS hypotheses when moving to new cell during sleep, the resynchronization may be reduced as compared to the example above where the mobile device reverts to the legacy procedure.

In some situations, the DS-SS format is not based on the cell ID or otherwise associated with a specific cell or base station. In this way, the prolonged "ON" time of the mobile device resulting from the delay of the mobile device's multiple attempts for different PSS/SSS hypotheses is avoided. Two examples are discussed below where one example is discussed with reference to FIG. 4 and FIG. 5 and another example is discussed with reference to FIG. 6.

Figure 4:
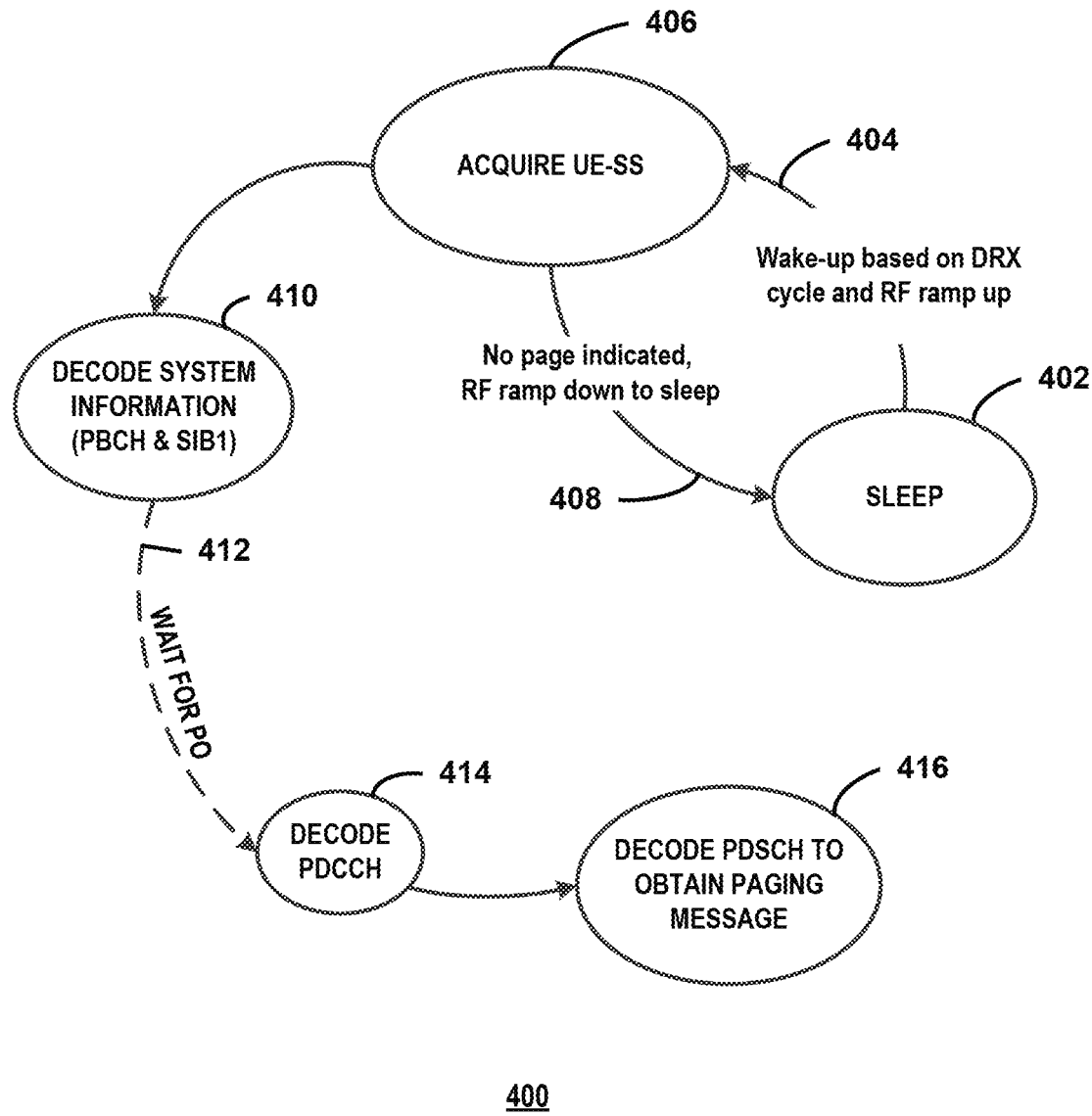
FIG. 4 is a state diagram for an example of a transition process 400 where the mobile device exists a sleep state and receives the DS-SS near the SSB.

FIG. 4 is a state diagram for an example of a transition process 400 where the mobile device 102 exists a sleep state 402 and receives the DS-SS near the SSB. Transmission process 400 may be performed for situations where the mobile device wakes up within the same cell that served the mobile device before it entered the sleep state. The transition process 400, however, may be particularly useful in situations where the mobile device enters the sleep state in a first cell and wakes up in a second, different cell. For the example, the mobile device 102 had received transmission format information 127 from a base station prior to entering the sleep state 402. From the sleep state 402, the mobile wakes up based on the DRX cycle and ramps up the RF circuits during the wakeup process 404. The mobile device transitions through the wake-up transition 404 to the DS-SS decode state 406. The mobile device 102 resynchronizes by the detecting the DS-SS and determines where a page message exists for the mobile device 102. If the DS-SS 13 does not indicate the page message is available, the mobile device returns to the sleep state 402. Otherwise, the mobile device proceeds to the decode system information state 410 where the mobile device decodes the PBCH to acquire the Master Information Block (MIB) and then decodes the SIB1. The MIB facilitates the mobile device in decoding the SIB1. The SIB1 provides information used by the mobile device to decode the PDCCH as well as the timing of the PTW. After the acquiring the system timing and system information, the mobile device 102 transitions through the paging time window (PTW) waiting state 412 before entering the decode PDCCH state 414. The mobile device 102, therefore, waits for the PTW to decode the PDCCH. The PDCCH provide the mobile device with the information that facilitates the decoding of the physical channel (e.g., PDSCH) to obtain the paging message at PDSCH decode state 416. An example of a suitable techniques for transitioning through the resynchronization state 406, decode PBCH state, 410 decode PDCCH state, and the decode PDSCH state 416 includes conventional techniques for resynchronization and acquiring the paging message.

Figure 5:
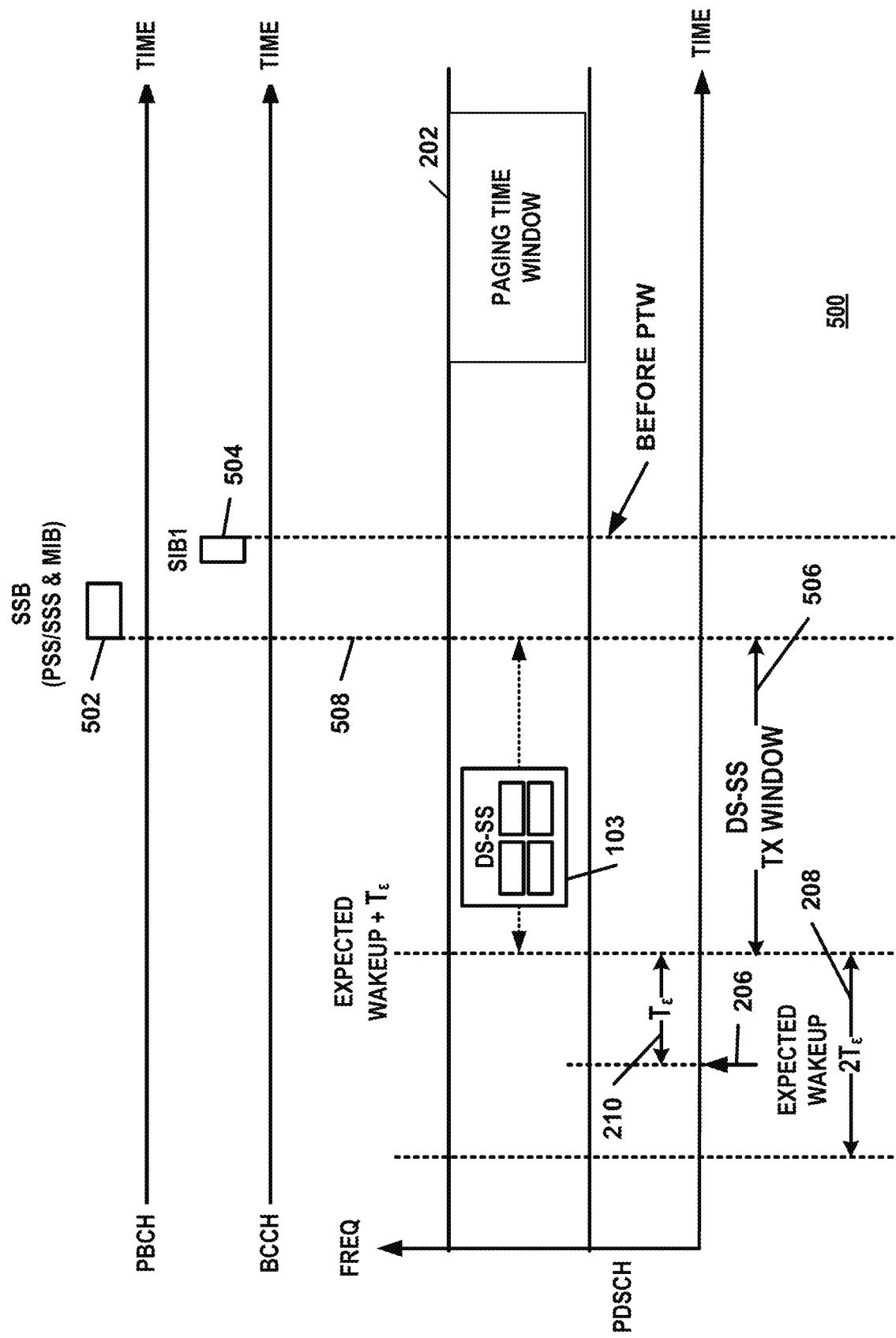
FIG. 5 is an illustration of an example of a DS-SS transmission where the mobile device determines a page message has been sent and acquires system information before decoding the page message.

FIG. 5 is an illustration of an example of a DS-SS transmission 500 where the mobile device 102 determines a page message has been sent and acquires system information before decoding the page message. The illustration is not necessarily to scale. For the example of FIG. 5, the mobile device 102 wakes up from the sleep state, detects the DS-SS 103 and determines that the DS-SS 103 indicates a page message is available. In response, the mobile device 102 decodes the SSB 502 received over the Physical Broadcast Channel (PBCH), then decodes the SIB1 504 transmitted over the Broadcast Control Channel (BCCH), a logical channel, before decoding the PDCCH and the PDSCH to obtain the page message. The SSB 502 includes the PSS/SSS and the MIB which facilitate decoding of the SIB1 504.

The DS-SS 103 is transmitted over a downlink physical channel, such as the PDSCH, and within a DS-SS transmission window 506. The base station 104, which may be different base station that served the mobile device before the sleep state, selects the transmission time of the DS-SS 103 to be no earlier than the expected wakeup time 206 plus the maximum drift error, $T_\varepsilon$, 210. In some situations, the base station assumes the maximum drift error, $T_\varepsilon$, 210 is zero since the mobile devices are capable of adjusting for clock-drift error. The base station 104 also selects the transmission time of the DS-SS 103 such that the DS-SS transmission is complete before the next SSB transmission 502 at the SSB transmission time, $T_{SSB}$, 508. Accordingly, the DS-SS transmission window 502 spans from the wakeup time 206 plus $T_\varepsilon$ 210 to $T_{SSB}$ 508. The DS-SS transmission time is also selected such that the SIB1 is before the PTW 202.

Figure 6:
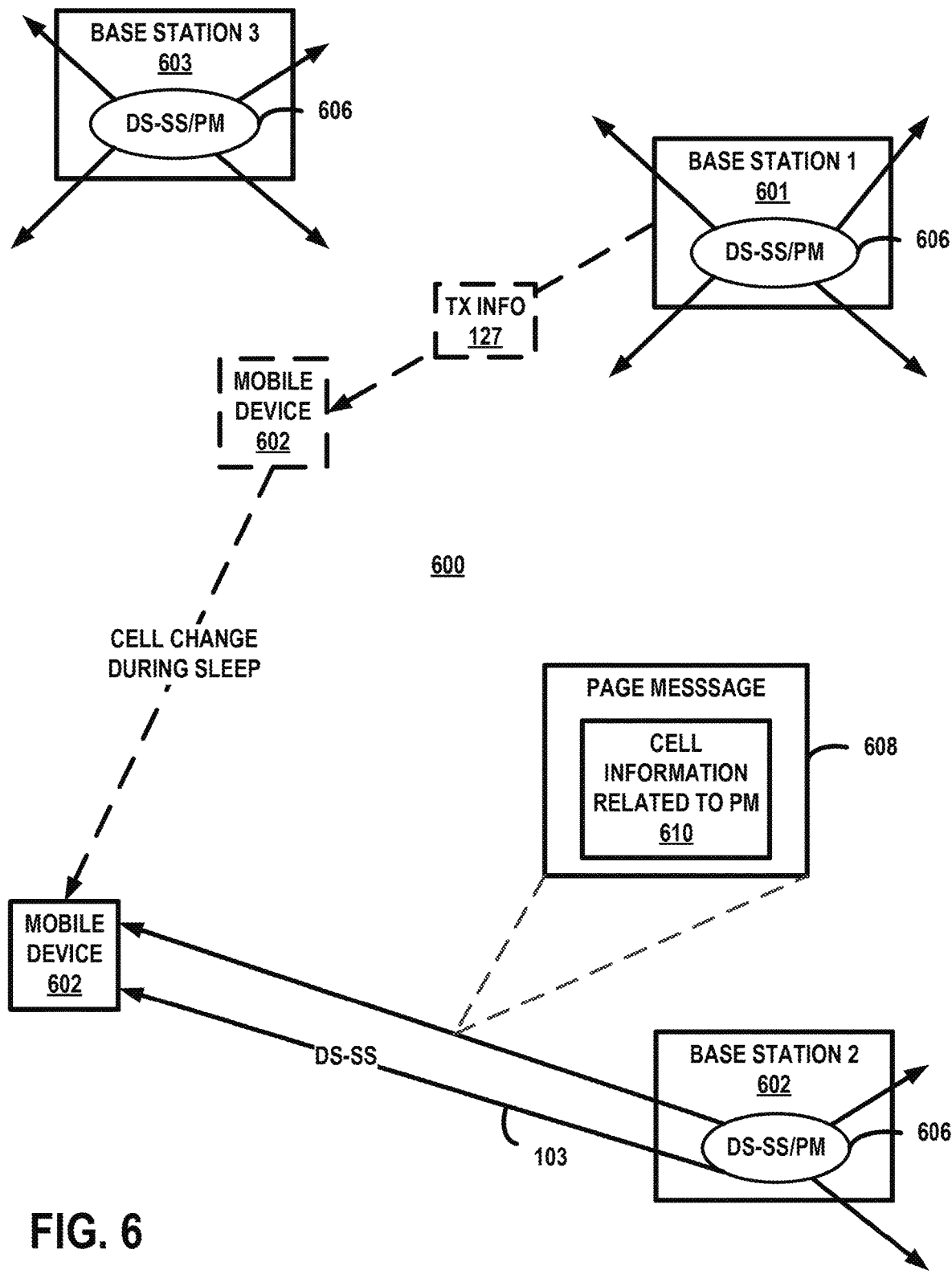
FIG. 6 is a block diagram of a communication system for an example where a mobile wireless user equipment (UE) device (mobile device) receives a device-specific synchronization signal (DS-SS) after moving to a new cell during the sleep state.

FIG. 6 is a block diagram of a communication system 600 for an example where a mobile wireless user equipment (UE) device (mobile device) 102 receives a device-specific synchronization signal (DS-SS) 103 after moving to a new cell during the sleep state. The communication system 600 of FIG. 6 is an example of the communication system 100 discussed above where two or more neighboring base stations 601, 602, 603 transmit the DS-SS and page message (DS-SS/PM) 606 for a mobile device that is served by at least one of the base stations. Although two base stations (602, 603) are shown neighboring the first base station 601 in FIG. 6, there may be several neighboring base stations. The base stations 601, 602, 603 are connected to each other such that information can be exchanged between the base stations. In one example, the base stations 601, 602, 603 are part of a group defined by a Tracking Area Identifier (TAI) in accordance with at least one revision of a 3GPP TS communication specification.

For the example of FIG. 6, the mobile device 102 is served within a cell of a first base station (base station 1) 601 before entering the sleep state. During the sleep state, the mobile device 102 enters the cell of a second base station (base station 2) 602. In most situations, the cell change is a result of the mobile device 102 changing geographical locations. Each of the neighboring base stations 602, 603 transmits DS-SS/PM 606 at the time specified in the transmission information 127 received earlier by the mobile device 102. For the examples herein, the paging format and the DS-SS format is previously coordinated and exchanged between the neighboring base stations. In one example, a fixed DS-SS format and fixed paging message format is set at deployment and may be revised semi-statically.

Continuing with the example of FIG. 6, the mobile device 102 executes a wakeup process at some point after entering the new cell of the second base station 602. In accordance with the transmission information 127 and a sleep cycle (such as DRX cycle), the mobile device 102 ramps up operation of the receiver circuits to prepare the mobile device to receive the DS-SS 103 at the specified time. The mobile device receives the DS-SS 103 transmitted by the second base station 602, performs resynchronization, and determines if a page is available. If no page is available, the mobile device 102 returns to the sleep state. Otherwise, the mobile device receives the page message 608 transmitted by the second base station 602. The page message 608 includes cell specific information 610 related to the transmission of the page message 608. For the examples herein, the information 610 is within a header of the page message 608. The information 610 in the header includes the information that is needed by the mobile device 102 to decode the paging message 608. In one example, the information 610 includes a subset of information provided by the cell's PBCH and/or SIB1. The base stations transmit multiple repetitions of the paging message to maximize successful detection of the page. Examples of suitable techniques for repeating transmissions include techniques in accordance with conventional procedures for MTC deployments.

Figure 7:
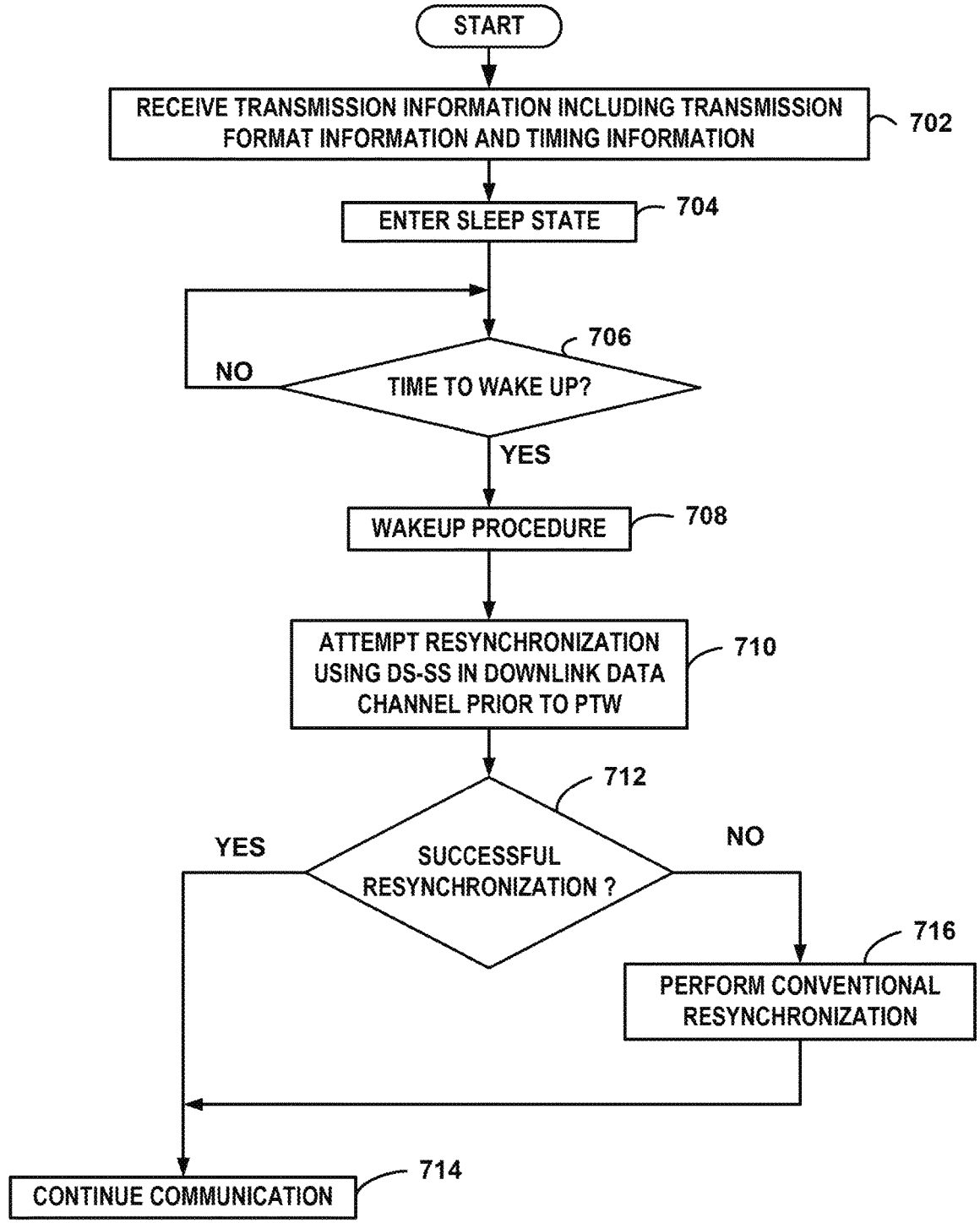
FIG. 7 is a flow chart of an example of a method of receiving a DS-SS within a physical downlink data channel performed at a mobile device.

FIG. 7 is a flow chart of an example of a method of receiving a DS-SS within a physical downlink data channel performed at a mobile device. Therefore, the method may be performed by devices such as the mobile device 102 discussed above.

At step 702, the mobile device receives the page message transmission information 127. For the example, the transmission information 127 includes transmission format information 128 and page message timing information 129. The transmission format information 128 is indicative of a transmission format of a page message for the mobile device and may include parameters such as MCS and MIMO modes. The page message timing information 129 is indicative of a transmission time of the page message. Where the mobile device is the mobile device associated with the page timing window, the transmission information 127 is sent to the mobile using RRC in the example. Where the mobile device is not associated with the page timing window, the transmission information 127 is broadcast to the mobile device using, for example a SIB message.

At step 704, the mobile device enters the sleep state. Accordingly, the mobile device receives the transmission information 127 before entering the sleep state.

At step 706, the mobile device determines whether the mobile device should exit the sleep state to monitor for page message. Where the device is the device associated with the PTW, the mobile device determines the appropriate time to wake up based on at least the DRX cycle and the page message timing information 129. The time to exit the sleep state is sufficiently early enough to prepare the receiver for receiving signals before the page message. Where the mobile device is not the mobile device associated with the PTW, the determination to wakeup may be based other criteria. For example, the mobile device may determine it needs to wake up because it has acquired data that need to be transmitted and it first needs to resynchronize. The mobile device determines the appropriate time to wake up based on whether there is need to wake up and the timing of the DS-SS that provides the transmission time of the DS-SS. If it is determined that the mobile device should exit the sleep state, the method continues at step 708. Otherwise, the method returns to step 704 where the mobile device returns to the sleep state.

At step 708, the mobile device executes a wakeup procedure. The wakeup procedure includes steps to warmup circuits and prepare the receiver and mobile device to receive signals in accordance with convention techniques.

At step 710, the mobile device attempts to receive the DS-SS 103. The mobile device uses the system timing 122 maintained at the mobile device to acquire subframe boundaries of the base stations transmissions and attempt reception of the DS-SS 103.

At step 712, it is determined whether resynchronization using the DS-SS was successful. The determination is made in accordance with known techniques for determining when resynchronization has been achieved. If the mobile device receives a sufficient number of the sequence instances without error to acquire resynchronization, the mobile device determines resynchronization was successful and the method continues at step 714 where the mobile device communicates with the base station using the resynchronized timing. Otherwise, the method continues at step 716.

At step 716, the mobile device uses conventional techniques to resynchronize. For example, the mobile device decodes the SSB including the PSS/SSS before further communication with the base station.

Figure 8:
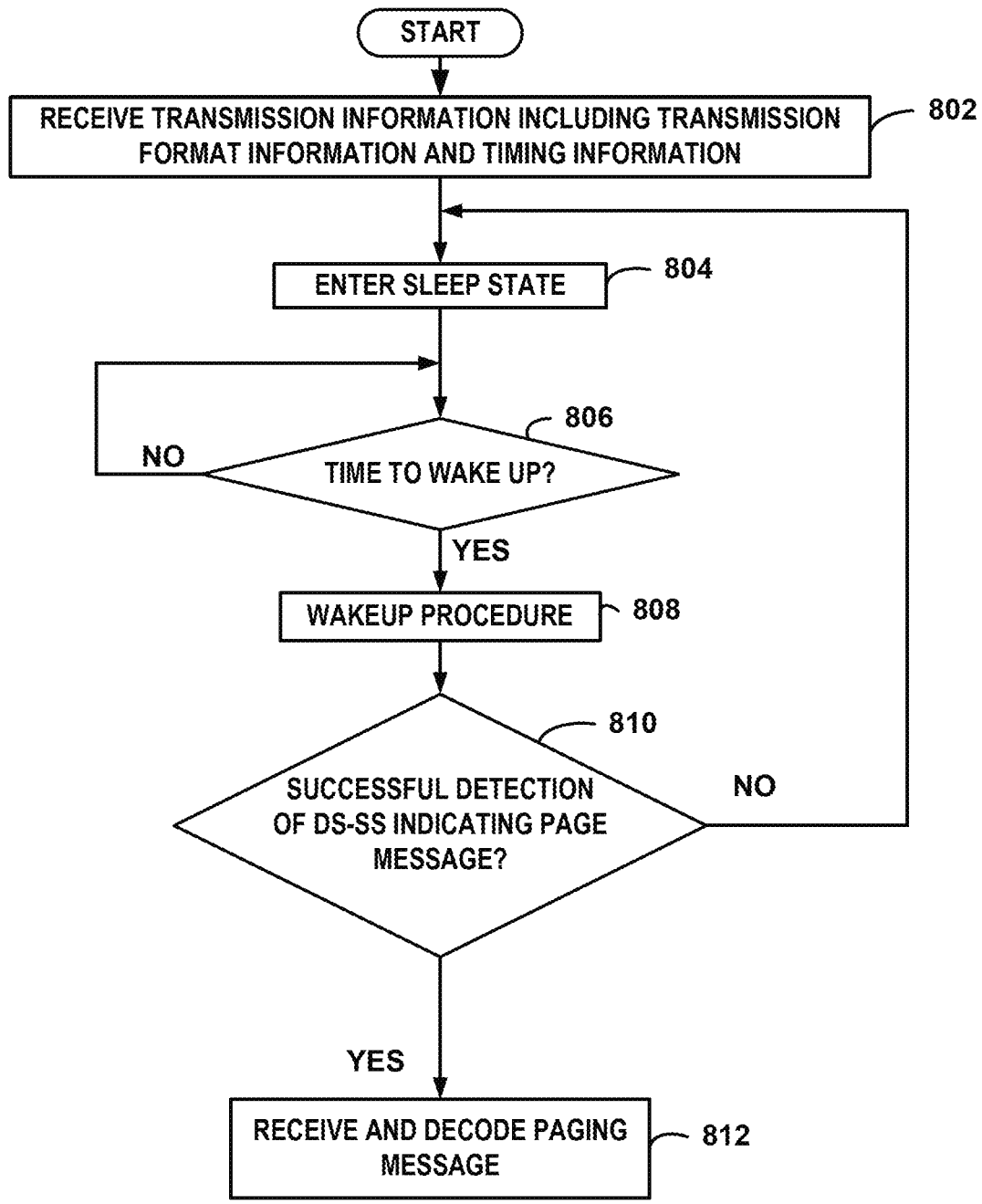
FIG. 8 is a flow chart of an example of a method of monitoring for a page message performed at a mobile device where the DS-SS indicates whether a page is available.

FIG. 8 is a flow chart of an example of a method of monitoring for a page message performed at a mobile device where the DS-SS indicates whether a page is available. Therefore, the method may be performed by devices such as the mobile device 102 discussed above.

At step 802, the mobile device receives the page message transmission information 127. For the example, the page message transmission information 127 includes transmission format information 128 and page message timing information 129. The transmission format information 128 is indicative of a transmission format of a page message for the mobile device and may include parameters such as MCS and MIMO modes. The page message timing information 129 is indicative of a transmission time of the page message.

At step 804, the mobile device enters the sleep state. Accordingly, the mobile device receives the page message transmission information 127 before entering the sleep state.

At step 806, the mobile device determines whether the mobile device should exit the sleep state to monitor for page message. For the example, the mobile device determines the appropriate time to wake up based on at least the DRX cycle and the page message timing information 129. The time to exit the sleep state is sufficiently early enough to prepare the receiver for receiving signals before the page message. If it is determined that the mobile device should exit the sleep state, the method continues at step 808. Otherwise, the method returns to step 804 where the mobile device returns to the sleep state.

At step 808, the mobile device executes a wakeup procedure. The wakeup procedure includes steps to warmup circuits and prepare the receiver and mobile device to receive signals in accordance with convention techniques.

At step 810, the mobile device attempts to receive the DS-SS 103 and determines whether the DS-SS 103 indicates a page message is being transmitted to the mobile device. The mobile device uses the system timing 122 maintained at the mobile device to acquire subframe boundaries of the base stations transmissions and attempt reception DS-SS. In some examples, the presence and successful detection of the DS-SS indicates the presence of the page. In other examples, the DS-SS is decoded to determines whether page exists for the mobile device. For example, the sequence instances are evaluated to determine what sequence was used for the DS-SS. If the DS-SS 103 indicates a page, the method continues to step 812 where the page is received and decoded. Otherwise, the method returns to the sleep state at 804.

As discussed above, the mobile device attempts to detect the DS-SS 103 without decoding a downlink control channel to obtain signal transmission information related to transmission of the page message. For at least some of the examples, the mobile device also refrains from receiving the SSB or other synchronization signals prior to attempting detection. The mobile device uses the transmission format information in the attempt to acquire the page message preamble sequence that is transmitted within a downlink data channel transmission from the base station.

Therefore, with the techniques discussed herein, the mobile device reduces the need to perform energy consuming resynchronization procedures and decoding of control channels for page message notification procedures. In addition, unnecessary resynchronization and control channel decoding is completely avoided when no page message has been sent.

Figure 9:
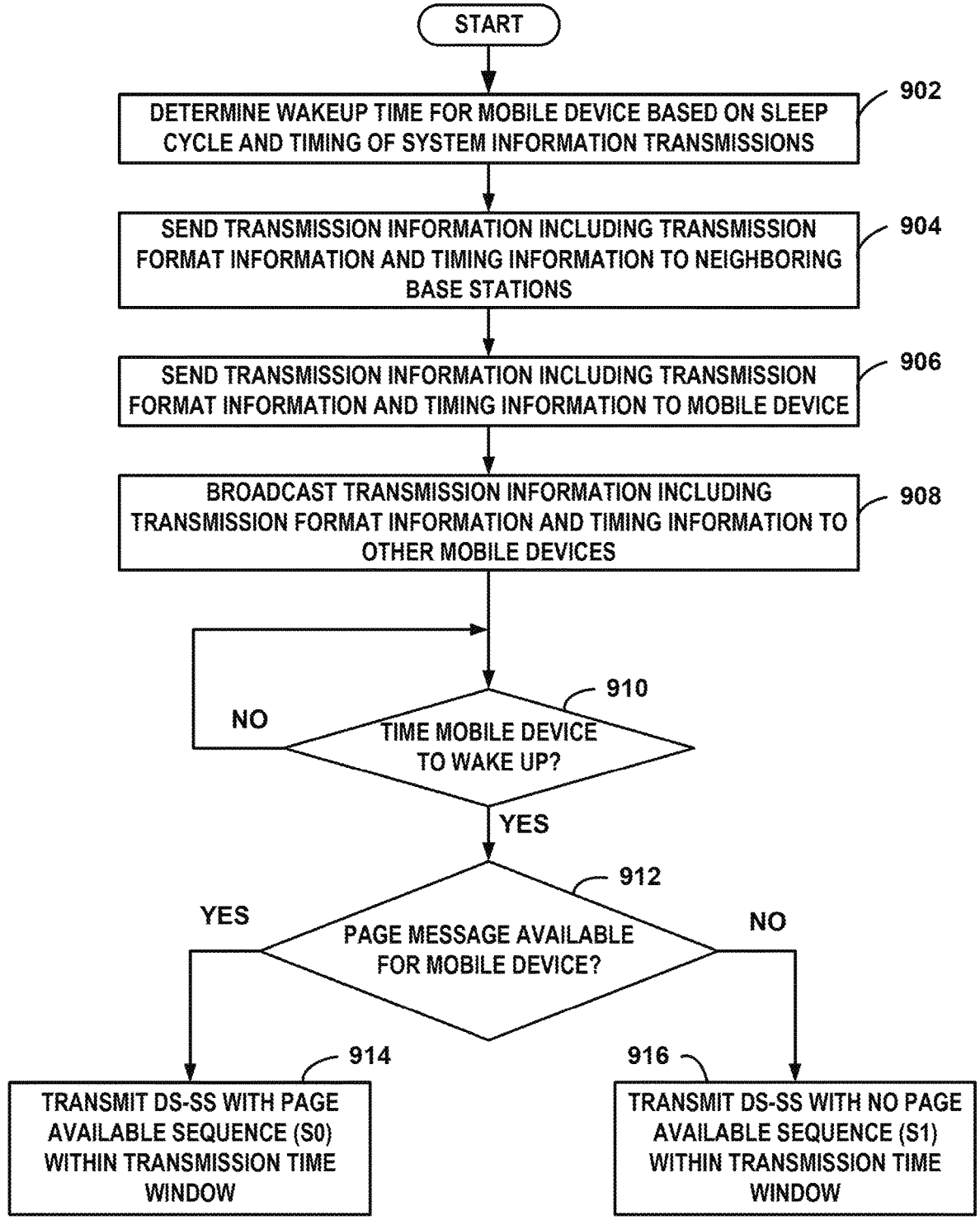
FIG. 9 is a flow chart of example of a method for transmitting a DS-SS in a physical downlink data channel.

FIG. 9 is a flow chart of example of a method for transmitting a DS-SS 103 in a physical downlink data channel. Accordingly, the method of FIG. 9 can be performed by a base station such as the base station 104 discussed above. Although the discussion in reference to FIG. 9 is directed to single mobile device, the base station typically services several mobile devices and the method can be applied to numerous mobile devices, MTC devices, and groups of mobile devices.

At step 902, the wakeup time for the mobile device is determined. The wakeup time may be based on the sleep cycle and the timing of the system information transmissions. For example, the base station determines a wakeup time at least based on a DRX cycle of the mobile device. In some circumstances, the base station also evaluates the SSB and SIB1 transmission times that are close to the wakeup time of the mobile device to fine tune the timing for maximum efficiency such that the mobile device can minimize the time it is not in the sleep state.

At step 904, the transmission information 127 for the DS-SS and the page message is determined and forwarded to the neighboring base stations. As discussed above, the neighboring base stations may be defined by a TAI in some situations. In one example, the transmission information 127 is transmitted over a backhaul using Xn signaling.

At step 906, the transmission information 127 for the DS-SS and the page message is sent to the mobile device. As discussed above, RRC techniques provide a suitable method of conveying the transmission information 127 to the mobile device 102.

At step 908, the transmission information 127 is broadcast to other mobile devices. The information may be transmitted using a SIB message although other broadcast techniques may be used.

At step 910, it is determined whether the mobile device will be waking up. The base station tracks at least the page message transmission time to determine when the mobile device will be waking up. In some situations, the bases station also evaluates the maximum clock drift expected of the timing of the mobile device. The base station, therefore, determines the DS-SS transmission window and determines whether it is time to transmit the DS-SS 103. If it is time, the method proceeds to step 912. Otherwise, the base station continues to track the wakeup time of the mobile device at step 910.

At step 912, it is determined if the mobile device needs to be paged. If a page message is pending, the method proceeds to step 914. If no page is pending, the method continues at step 916.

At step 914, the base station generates the DS-SS 103 using the page indicator sequence. In one example, if the sequence used to indicate a page is sequence $S_0$, the base station generates an N by M block with using sequence instances based on the sequence $S_0$. The DS-SS 103 indicating a page message is available is transmitted within the DS-SS transmission window.

At step 916, the base station generates the DS-SS 103 using the no-page indicator sequence. In one example, if the sequence used to indicate a page is sequence $S_1$, the base station generates an N by M block using sequence instances based on the sequence $S_1$. The DS-SS 103 indicating no page message is available is transmitted within the DS-SS transmission window.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
    prior to entering a sleep state at a mobile device, receiving device-specific synchronization signal (DS-SS) transmission information comprising:
        frequency-time transmission resource information indicative of frequency-time resources used for transmitting a DS-SS transmission to the mobile device; and
        transmission time information indicative of a transmission time of the DS-SS transmission;
    entering the sleep state;
    executing, at a time at least partially based on the transmission time information, a wakeup sequence to prepare the mobile device to receive signals at the transmission time;
    using the DS-SS transmission information to receive the DS-SS transmission over a downlink physical channel before a page time window (PTW) designated for transmission of a page message over the downlink physical channel to the mobile device, the DS-SS transmission within a PTW frequency bandwidth of the PTW and indicating existence of the page message for the mobile device, the DS-SS transmission comprising M times N synchronization sequence instances transmitted in M times N frequency-time blocks. each frequency-time block having one of M frequencies and one of N time segments, each synchronization sequence instance transmitted in one of the frequency-time blocks;

evaluating the DS-SS transmission to determine whether the DS-SS indicates page message exists for the mobile device; and returning to the sleep state in response to determining the page message is not available.

2. A method comprising:

determining a scheduled transmission time for a device-specific synchronization signal (DS-SS) transmission at least partially based on a paging time window (PTW) for a mobile device;

prior to the mobile device entering a sleep state, transmitting DS-SS transmission information comprising transmission time information indicative of the scheduled transmission time of the DS-SS transmission;

sending the DS-SS transmission information to neighboring base stations; and transmitting the DS-SS at a time based on the scheduled transmission time and within a PTW frequency bandwidth of the PTW over a physical downlink channel, the DS-SS indicating existence of a page message for the mobile device.

3. The method of claim 2, wherein the DS-SS transmission information comprises frequency-time transmission resource information indicative of frequency-time resources used for transmitting a DS-SS transmission to the mobile device.

4. The method of claim 2, wherein the DS-SS transmission comprises M times N synchronization sequence instances transmitted in M times N frequency-time blocks, each frequency-time block having one of M frequencies and one of N time segments, each synchronization sequence instance transmitted in one of the frequency-time blocks.

5. The method of claim 4, wherein each synchronization sequence instance is based on a single root sequence.

6. The method of claim 5, wherein the synchronization sequence instances are copies of a single sequence.

7. The method of claim 4, wherein the DS-SS indicates the page message is available where each sequence instance is a page indicator sequence and the DS-SS indicates no page message is available where each sequence instance is a no-page indicator sequence different from the page indicator sequence.

8. The method of claim 4, wherein the DS-SS transmission is completed prior to the PTW by a transmission interval, $T_a$, and wherein the transmission information comprises: communication resource information indicative of the time-frequency communication resources used for transmitting the DS-SS, M, N, $T_a$, and a sequence length of the sequence instances.

9. The method of claim 8, wherein the transmitting the transmission information comprises transmitting the transmission information a Radio Resource Control (RRC) message.

10. The method of claim 4, wherein transmitting the DS-SS transmission comprises transmitting the DS-SS transmission prior to a System Synchronization Block (SSB) transmission and an SIB1 transmission, at least one of the SSB transmission and the SIB1 transmission comprising page message transmission information indicative of a page message transmission of the page message.

11. The method of claim 2, wherein the DS-SS transmission information further comprises at least one of a sequence assigned to the DS-SS transmission and a sequence length of the DS-SS transmission.

12. The method of claim 4, wherein the N time segments are consecutive time segments.

13. The method of claim 4, wherein the M frequencies are consecutive frequencies.

14. The method of claim 4, wherein the DS-SS is specific to the PTW and the PTW is designated for transmission of a plurality of page messages, each page message of the plurality for a different mobile device, the method further comprising:

transmitting page message transmission information in a header of each page message identifying the mobile device associated with the page message.

15. The method of claim 14, further comprising transmitting broadcast information in a System Synchronization Block (SSB) on a Physical Broadcast Channel (PBCH) and an SIB1, wherein the page message transmission information is at least a subset of the broadcast information.

16. The method of claim 15, wherein the DS-SS transmission time is based on a SSB transmission time and a SIB1 transmission time, the DS-SS transmission time before the SSB transmission time and the SIB1 transmission time, the SSB transmission time and the SIB1 transmission time before the PTW.

17. The method of clam 20, further comprising:

receiving other DS-SS transmission information from a neighboring base station; and transmitting another DS-SS in accordance with the DS-SS transmission information.

18. A mobile device comprising:

a receiver configured to, prior to entering a sleep state, receive device-specific synchronization signal (DS-SS) transmission information comprising:

frequency-time transmission resource information indicative of frequency-time resources used for transmitting a DS-SS transmission to the mobile device; and transmission time information indicative of a transmission time of the DS- SS transmission;

a controller configured to:

place the mobile device in a sleep state; and execute, at a time at least partially based on the transmission time information, a wakeup sequence to prepare the mobile device to receive signals at the transmission time;

the receiver further configured to use the DS-SS transmission information to receive the DS-SS transmission over a downlink physical channel before a page time window (PTW) designated for transmission of a page message over the downlink physical channel to the mobile device, the DS-SS transmission within a PTW frequency bandwidth of the PTW and indicating existence of the page message for the mobile device, the DS-SS transmission comprising M times N synchronization sequence instances transmitted in M times N frequency-time blocks, each frequency-time block having one of M frequencies and one of N time segments, each synchronization sequence instance transmitted in one of the frequency-time blocks;

the controller further configured to evaluate the DS-SS transmission to determine whether the DS-SS indicates page message exists for the mobile device and to return the mobile device to the sleep state in response to determining the page message is not available.

\* \* \* \* \*